United States Patent [19]
Anderson

[11] 3,763,044
[45] Oct. 2, 1973

[54] BLOCK COPOLYMERS AS VISCOSITY INDEX IMPROVERS FOR LUBRICATING OILS

[76] Inventor: William S. Anderson, 6408 Irwin Court, Apt. 3, Oakland, Calif. 94609

[22] Filed: Dec. 12, 1969

[21] Appl. No.: 884,721

[52] U.S. Cl. ............... 252/59, 260/879, 260/880 B
[51] Int. Cl. ............................................. C10m 1/18
[58] Field of Search ....................................... 252/59

[56] References Cited
UNITED STATES PATENTS

| | | | |
|---|---|---|---|
| 2,478,843 | 8/1949 | Seymour et al. | 252/59 |
| 2,798,853 | 7/1957 | Young et al. | 252/59 X |
| 2,910,458 | 10/1959 | Goering et al. | 252/59 X |
| 3,089,832 | 5/1963 | Black et al. | 252/59 X |
| 3,451,920 | 6/1969 | DeVault | 208/33 |
| 3,465,063 | 9/1969 | Hassell et al. | 260/94.7 |
| 3,509,056 | 4/1970 | Shepherd | 252/59 |
| 3,554,911 | 1/1971 | Schiff et al. | 252/59 |
| 3,630,905 | 12/1971 | Sorgo | 252/59 |

FOREIGN PATENTS OR APPLICATIONS

| | | | |
|---|---|---|---|
| 6,405,443 | 11/1964 | Netherlands | 252/59 |

OTHER PUBLICATIONS

Kirk–Othmer, "Encyclopedia of Chem. Technol." Vol. 10 (1953) pages 965–968.

*Primary Examiner*—Daniel E. Wyman
*Assistant Examiner*—W. Cannon
*Attorney*—William H. Myers and Joseph W. Brown

[57] ABSTRACT

Certain two-block copolymers have been found to be highly effective viscosity index improving additives for mineral oils and are especially effective at elevated temperatures.

7 Claims, No Drawings

BLOCK COPOLYMERS AS VISCOSITY INDEX IMPROVERS FOR LUBRICATING OILS

This invention is concerned with lubricating compositions. More particularly, it is directed to lubricating oils having substantially improved shear stability and viscosity index.

Mineral lubricating oils have been modified by a vast array of additives for purposes of improving viscosity index, thermal stability, oxidation stability, detergency, and other properties. The viscosity index is highly important especially in multi-grade oils to provide lubricating oil compositions having much flatter viscosity-temperature curve than the unmodified oil. It is especially vital that the lubricating oil compositions exhibit specified maximum viscosities at relatively low temperatures and specified minimum viscosities at relatively elevated temperatures. The viscosity index of mineral lubricants has been altered by the presence of high molecular weight polymeric additives such as polymethacrylates. However, apparently due to their high molecular weight, such additives are found to be sensitive to thermal and oxidative degradation and particularly to degradation under the degree of shear which is experienced during dynamic utilization of the lubricant in machinery and the like. Thus while the additive may be promising as a viscosity index improver in mineral lubricants prior to its exposure to shear forces, in many instances it is found that many of the compositions rapidly lose their initial beneficial properties and gradually revert to the undesirable viscosity-temperature relationships of unmodified oil. The search for new and improved types of viscosity index improvers is not aided by observing the effect of various potential additives in mineral fuels such as fuel oil, gasoline, kerosene and the like, since the demands made by such fuels have little if any relationship to the viscosity index requirements and physical conditions encountered with lubricating oil compositions. Many materials are useful, for example, as pour point reducing agents in fuels but have little if any effect upon the viscosity index thereof. Moreover, the use of many viscosity index improving agents in lubricating oils have substantially no beneficial effect upon the properties of fuel oils. Consequently, the arts surrounding these two separate fields has grown up independently of each other.

In addition to the properties of improving viscosity index and of being stable under conditions of high shear, it is necessary for any potential lubricating oil additives to have two other important properties, namely, compactibility with the lubricating oil and stability under conditions of oxidation which would be reasonably expected to be encountered under conditions of storage and use of such compositions.

It is an object of the present invention to provide improved mineral oil compositions. It is a particular object of the invention to provide lubricating oil compositions having substantially improved viscosity index properties. It is a further object of the invention to provide multi-grade lubricating oil compositions exhibiting substantially improved viscosity properties under shear encountered during lubricating operations. It is a further object of the invention to provide an improved method of lubrication. Other objects will become apparent during the following detailed description of the invention.

Now, in accordance with the present invention, improved lubricating compositions are provided comprising a mineral oil and as a viscosity index improver therefor 0.75–5.0 percent by weight of a block copolymer having the general formula $$A-B$$

wherein A is a block of the group consisting of polystyrene polymer blocks and hydrogenation products thereof having an average molecular weight between about 5,000 and 50,000, B is a hydrogenated polymer block of isoprene wherein at least 50 percent of the original olefinic double bonds have been reduced by hydrogenation said block having average molecular weight between about 10,000 and 1,000,000.

Still in accordance with the present invention, an improved process of lubrication is provided comprising lubricating relatively moving metallic surfaces with the mineral lubricating oil compositions just described.

The mineral oil lubricants for engines particularly contemplated for use in the present compositions generally have viscosities between about 150 and about 250 SSU at 100°F and generally are described as having SAE grades of 5–50. These are usually mineral oil disillates but may comprise or contain mineral oil residuals as long as the composition has lubricating properties. While low viscosity index mineral lubricants are employed, it is much more desirable to utilize those having viscosity indexes between about 120 and about 200, the higher the better, especially when multi-grade lubricants are being compounded. Multi-grade lubricants are especially contemplated such as 10/30 or 20/40 oils either for summer or winter use. Oils suitable in greases, hydraulic fluids, and open gear lubricants also are contemplated.

In accordance with the present invention, the essence thereof lies primarily in the discovery that certain and only certain block copolymers are not only compatible with mineral oil lubricants but also substantially improve the viscosity indexes thereof and exhibit a surprising and unaccountable degree of stability under the rates of shear expected and encountered during lubricating operations. Moreover, due to the substantial degree of hydrogenation as more particularly described hereinafter, the polymers so treated are especially stable even under oxidizing conditions. Furthermore, one of the aspects of the present invention lies in the relatively low molecular weight of the polymers utilized therein as compared with the substantially higher molecular weight polymers utilized by the prior art. The stability of the polymers of this invention under degrees of thermal stress, oxidative influences and particularly under shear is not only highly unexpected but essential to their success in lubricating processes. Contrary to the scission which may occur when a random copolymer or homopolymer degrades, the permanent scission of a block copolymer will result in catastrophic degradation of its physical properties as well as of its molecular structure.

It is essential for the block copolymers to be compatible with the mineral lubricating oils in which they are utilized if they are to be successful viscosity index improving additives. For this purpose it is necessary to carefully select the block molecular weights and type of block which in the entire structure of the block copolymer will be compatible with the lubricating oil. This may of course vary to a certain degree depending upon the aromatic and aliphatic contents of such oils. However, the generic aspect of the present invention broadly contemplates the several types of block copolymers which will be suitable in this respect. Polymers useful in the present invention are referred to as A—B type in which A represents a block of the group consisting of styrene polymer blocks or hydrogenated products thereof while B represents a polymer block of the group consisting of conjugated diene polymers, and hydrogenated conjugated diene polymer blocks. In the latter case at least about 50% of the original olefinic double bonds have been reduced by hydrogenation subsequent to polymerization. The present invention furthermore contemplates the average molecular weight limitations of each of these blocks, block A being limited to average molecular weights between about 5,000 and 50,000 (preferably 9,000 and 35,000) which B is limited to average molecular weights between about 10,000 and 1,000,000, (preferably 15,000 and 200,000). SBR is the well known trade term for random styrene/butadiene copolymer.

The block copolymers are hydrogenated to reduce their olefinic unsaturation by at least 50 percent and preferably at least 80 percent of the original olefinic double bonds. Moreover, any of the block copolymers having a monovinyl arene polymer block may be hydrogenated so as to reduce the original aromatic double bonds by at least 50 percent and preferably at least 80 percent. Hydrogenation is preferably carried out in solution utilizing either homogeneous or heterogeneous catalysts. If both aromatic and olefinic double bonds are to be reduced then relatively stringent hydrogenation conditions may be employed. Preferably, however, the more readily saturated olefinic double bonds are first reduced at relatively mild hydrogenation conditions after which temperature and pressure may be increased so as to effectively cause reduction of aromatic unsaturation. Catalysts such as cobalt or nickel salts or alkoxides reduced with aluminum alkyl compounds preferably are employed as catalysts. Suitable catalysts include nickel acetate, nickel octoate, or nickel acetyl acetonate reduced with aluminum alkyl compounds such as aluminum triethyl or aluminum tri-isobutyl.

The following examples illustrate the benefits obtained and the limits of the present invention.

EXAMPLE I

| | Parts by Weight |
|---|---|
| Lubricating oil | 100 |
| Carbonated Ca sulfonates | 1.2 |
| Polybutenyl succinimide of polyethylene amine | 5.0 |
| Zinc dialkyl dithiophosphates | 0.12 |
| Iso-octylphenoxyl tetraethoxyethanol | 0.1 |
| Silicone oil | 10 ppm |

For comparison, a solution of a well-known viscosity index improving additive at a concentration of 2.1 weight percent was prepared. This additive was a random terpolymer about 800,000 molecular weight composed of 60 percent lauryl methacrylate, 35 percent stearyl methacrylate, and 5 percent 2-methyl-5-vinylpyridine. A block copolymer having the structure polystyrene-hydrogenated polyisoprene was dispersed in a portion of the base oil and tested in comparison with the base oil and the polymethacrylate blend. Each block of the copolymer had an average molecular weight of 21,000.

The shear stability of the polymer in solution was determined by the kinematic viscosity loss of the solution measured at 210°F resulting from polymer degradation in a Raytheon Sonic Shear apparatus. Thirty cc samples were degraded at 100°F for 30 minutes at a frequency of 9170 cycles per second and kinematic viscosities of the solution were measured before and after shear. The viscosity loss at 210°F attributable to polymer degradation is given by the equation $$\% \text{ loss} = (V_I - V_F)/(V_I - V_B) \times 100$$

where $V_I$, $V_F$, and $V_B$ refer to viscosities of the initial solution before shear, of the solution after shear, and of the base oil blend less VI improver, respectively, The results are given in the table below.

TABLE I

| Sample | Percent weight polymer | Viscosity before shear | | | Viscosity after shear | | | Percent loss |
|---|---|---|---|---|---|---|---|---|
| | | 0° (cp.) | 100° (SUS) | 210° (SUS) | 0° (cp.) | 100° (SUS) | 210° (SUS) | |
| Base blend | | 1,800 | 187 | 48.0 | 1,820 | 186 | 47.6 | |
| Polymethacrylate | 2.1 | 2,100 | 377 | 75.3 | 2,050 | 271 | 59.1 | 59 |
| Block copolymer | 2.3 | 2,550 | 365 | 66.7 | 2,600 | 360 | 66.3 | 0.2 |

The viscosity measurements in the table are to be compared not only with each other but also with the specifications which a 10/30 motor oil must meet. It must have a maximum viscosity at 0°F of 2400 cp and a minimum viscosity at 210°F of 58 SUS.

Thus it is clear from the table that the commercially utilized comparative terpolymer has suitable low temperature viscosity properties. However, it loses much of its high temperature viscosity due to polymer shear, apparently because of its very high molecular weight. The polymers of this invention, however, showed better stability toward shear then the comparative terpolymer possibly not only because of their stable structure but because of their relatively low molecular weights. Despite its low molecular weights, it gave thickening power at 210°F comparable to that of the commercially utilized comparative terpolymer and at a comparable concentration.

In similar tests a hydrogenated random SBR rubber was tested for its shear degradation. It was found that it lost about two-thirds of its thickening power in similar tests.

I claim as my invention:

1. A lubricating composition comprising a major proportion of a mineral oil and as a viscosity index improver therefor 0.75–5.0 percent by weight of a block copolymer having the general configuration

A—B wherein each A is a block of the group consisting of polystyrene, hydrogenated polystyrene, and poly(vinyl cyclohexane), said block A having an average molecular weight between about 9,000 and 35,000 and B is a hydrogenated polymer block of isoprene wherein at least 50 percent of the original double bonds have been reduced by hydrogenation of the block copolymer, said block B having an average molecular weight between about 15,000 and 200,000.

2. A composition according to claim 1, wherein the mineral oil is a lubricating oil.

3. A composition according to claim 1 wherein the block polymer comprises a block polymer of isoprene and styrene wherein at least about 85 percent of the original olefinic and aromatic double bonds have been reduced by hydrogenation.

4. A lubricating composition according to claim 1 comprising a mineral lubricating oil and 1.0–4.5 percent by weight of a two-block copolymer having one polystyrene block and one hydrogenated polyisoprene block.

5. A lubricating composition according to claim 1 comprising a mineral lubricating oil and 1.0–4.5 percent by weight of a 2-block copolymer having one hydrogenated polystyrene block and one hydrogenated isoprene block.

6. A lubricating composition according to claim 1 having a viscosity no greater than about 2600 cp at 0°F and a viscosity of at least about 50 cp at 210°F.

7. A lubricating composition according to claim 1 containing in addition a stabilizing proportion of lubricating oil detergent.

* * * * *